United States Patent [19]

Creed et al.

[11] Patent Number: 4,549,298
[45] Date of Patent: Oct. 22, 1985

[54] DETECTING AND CORRECTING ERRORS IN DIGITAL AUDIO SIGNALS

[75] Inventors: David M. Creed; John G. S. Ive, both of Basingstoke, England

[73] Assignee: Sony Corporation, Tokyo, Japan

[21] Appl. No.: 508,189

[22] Filed: Jun. 27, 1983

[30] Foreign Application Priority Data

Jun. 29, 1982 [GB] United Kingdom ............... 8218727

[51] Int. Cl.⁴ .............................................. G06F 11/10
[52] U.S. Cl. ........................................ 371/40; 371/38
[58] Field of Search ............................ 371/38, 39, 40

[56] References Cited

U.S. PATENT DOCUMENTS 4,211,997 7/1980 Rudnick et al. ...................... 371/38
4,413,340 11/1983 Odaka et al. ......................... 371/39
4,447,902 5/1984 Wilkinson .............................. 371/39

Primary Examiner—Charles E. Atkinson
Attorney, Agent, or Firm—Lewis H. Eslinger; Alvin Sinderbrand

[57] ABSTRACT

A method of detecting and correcting errors in digital audio signals comprises assembling digital data words each of which corresponds to a digital audio signal representing an analog audio sample into units of six data words, assembling with each unit six redundant words derived by exclusive-OR operations on the data word in each row and each column of the unit, assembling the data words and redundant words into sub-blocks and adding cyclic redundancy check code words to the sub-block, recording and reproducing each sub-block, after reproduction using the code words of each sub-block to set the logic state of error flags that have been added to each word in the sub-block, re-forming the units and assembling with each reproduced unit horizontal and vertical syndromes derived by exclusive-OR operations on the data words and redundant words in each row in each column of the unit, comparing the horizontal and vertical syndromes and resetting the logic state of the error flags in dependence on this comparison, deriving further horizontal syndromes by exclusive-OR operations on the data words and redundant words in each row of the reproduced unit and where there is only a single word in a row flagged as being in error, correcting that error word using the further horizontal syndrome, and deriving further vertical syndromes by exclusive-Or operations on the data words and the redundant word in each column of the reproduced unit and where there is only a single word in that column in error, correcting that error word using the further vertical syndrome.

14 Claims, 10 Drawing Figures

FIG. 1

| $M_1$ | $M_2$ | $M_3$ | $R_4$ |
| $M_4$ | $M_5$ | $M_6$ | $R_5$ |
| $R_1$ | $R_2$ | $R_3$ | $R_6$ |

| $U_1$ | $U_2$ | $U_3$ | $W_4$ | | $E_a$ | $E_b$ | $E_c$ | $E_d$ |
| $U_4$ | $U_5$ | $U_6$ | $W_5$ | | $E_e$ | $E_f$ | $E_g$ | $E_h$ |
| $W_1$ | $W_2$ | $W_3$ | $W_6$ | | $E_i$ | $E_j$ | $E_k$ | $E_l$ |

FIG. 6

| $U_1$ | $U_2$ | $U_3$ | $W_4$ | $S_5$ |
| $U_4$ | $U_5$ | $U_6$ | $W_5$ | $S_6$ |
| $W_1$ | $W_2$ | $W_3$ | $W_6$ | $S_7$ |
| $S_1$ | $S_2$ | $S_3$ | $S_4$ | |

DETECTING AND CORRECTING ERRORS IN DIGITAL AUDIO SIGNALS

BACKGROUND OF THE INVENTION

1. Field of the Invention

This invention relates to methods of and apparatus for digital audio signal processing. More particularly, the invention relates to methods of and apparatus for the detection and correction of errors present on reproduction of a digital audio signal, for example, from a magnetic recording medium such as a magnetic tape.

2. Description of the Prior Art

Errors may occur in a reproduced digital signal due to drop-out or noise. These errors are of particular significance in a digital audio signal most especially if the errors affect the more significant bits of an audio sample signal, because on conversion of the digital signal to a corresponding analog signal and reproduction of that analog signal, the error in the reproduced analog sound signal will be very noticeable to the human ear. It is therefore of particular importance in the processing of digital audio signals that a powerful error detecting and correcting scheme is provided.

SUMMARY OF THE INVENTION

One object of the present invention is to provide an improved method of detecting and correcting errors in digital audio signals.

Another object of the present invention is to provide an improved apparatus for detecting and correcting errors in digital audio signals.

Another object of the present invention is to provide an improved method of detecting and correcting errors in digital audio signals wherein digital data words corresponding to an analog audio signal are assembled into and processed as correction units.

According to the present invention there is provided a method of detecting and correcting errors in digital audio signals, the method comprising the steps of:

assembling digital data words each of which corresponds to a digital audio signal representing a sample of an analog audio signal, into units consisting of m rows and n columns of said data words;

assembling with each said unit a plurality of redundant words derived by a respective exclusive-OR operation on said data words in each row and each column of said unit;

shuffling the order of said data words and said redundant words and then assembling the shuffled words into sub-blocks, deriving from said words in said sub-block a plurality of error detection code words and adding said code words to said sub-block;

recording and reproducting each said sub-block;

after reproduction, using said code words of each said sub-block to set the logic state of error flags that have been added to each said word in said sub-block;

de-shuffling the order of said shuffled words and then re-forming said units and assembling with each said reproduced unit a plurality of horizontal and vertical syndromes derived by a respective exclusive-OR operation on said data words and said redundant word in each row and each column of said unit;

comparing said horizontal and vertical syndromes associated with said sub-block and resetting the logic state of said error flags in dependence on said comparison;

deriving further horizontal syndromes by a respective exclusive-OR operation on said data words and said redundant word in each row of said reproduced unit and where there is only a single word in that row flagged as being in error, correcting that error word using said further horizontal syndrome; and deriving further vertical syndromes by a respective exclusive-OR operation on said data words and said redundant word in each column of said reproduced unit and where there is only a single word in that column flagged as being in error, correcting that error word using said further vertical syndrome.

According to the present invention there is also provided apparatus for detecting and correcting errors in digital audio signals, the apparatus comprising:

means for assembling digital data words each of which corresponds to a digital audio signal representing a sample of an analog audio signal into units consisting of m rows by n columns of said data words;

means to derive a plurality of redundant words by a respective exclusive-OR operation on said data words in each row and each column of said unit and to assemble said redundant words with said unit;

means to shuffle the order of said data words and said redundant words; means to assemble said data words and said redundant words into sub-blocks, to derive from said words in said sub-block a plurality of error detection code words, and to add said code words to said sub-block;

means to record and reproduce each said sub-block; means operative after reproduction and using said code words of each said sub-block to set the logic state of error flags that have been added to each said word in that said sub-block; means to de-shuffle the order of said shuffled words;

means to re-form said units and to derive by a respective exclusive-OR operation on said data words and said redundant word in each row and each column of said unit a respective horizontal and vertical syndrome and to associate said syndromes with said unit;

means to compare said horizontal and vertical syndromes and reset the logic state of said error flags in dependence on said comparison;

means to derive further horizontal syndromes by a respective exclusive-OR operation on said data words and said redundant word in each row of said reproduced unit and where there is only a single word in that row flagged as being in error, to correct that error word using said further horizontal syndrome; and means for deriving further vertical syndromes by a respective exclusive-OR operation on said data words and said redundant word in each column of said reproduced unit and where there is only a single word in that column flagged as being in error, correcting that error word using said further vertical syndrome.

The above, and other objects, features and advantages of this invention will be apparent from the following detailed description of illustrative embodiments which is to be read in connection with the accompanying drawings.

DESCRIPTION OF THE PREFERRED EMBODIMENTS

An embodiment of the invention will first be described in general terms with reference to FIGS. 1 to 6, and then some more detailed description will be given with references to FIGS. 7 to 10.

Figure 1:
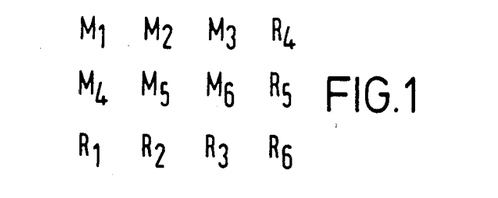
FIG. 1 indicates the words forming a correction unit.

An input audio signal is converted to digital form by being sampled at a frequency of 48 kHz and by pulse code modulating each of the resulting analog audio sample signals into a 16-bit digital sample signal. Thus, each digital sample signal can represent any one of $2^{16}$ levels. Six digital sample signals together with six redundant 16-bit words are assembled together to form a correction unit. FIG. 1 indicates such a correction unit where:

$M_1$ to $M_6$ are the 16-bit digital sample signals, and
$R_1$ to $R_6$ are the 16-bit redundant words.

The redundant words $R_1$ to $R_6$ are derived by exclusive-OR operations as follows:

$R_1 = M_1 \oplus M_4$ $R_2 = M_2 \oplus M_5$ $R_3 = M_3 \oplus M_6$ $R_4 = M_1 \oplus M_2 \oplus M_3$ $R_5 = M_4 \oplus M_5 \oplus M_6$ $R_6 = M_1 \oplus M_2 \oplus M_3 \oplus M_4 \oplus M_5 \oplus M_6$ Before recording, the 16-bit words are shuffled in order, for example, by being stored in and subsequently read from a store such as a random access memory (RAM) using a program which shuffles the order of the words in a predetermined manner. Thus on reproduction, a corresponding RAM using a similar program can effect the necessary de-shuffling to restore the 16-bit words to their original order in the original sub-blocks. This shuffling will distribute words which in the original sub-blocks were adjacent to one another quite widely, so that in the event of a drop-out on reproduction resulting in the loss of a continuous sequence of several or even several tens of words, the lost words will, after de-shuffling, be distributed over many sub-blocks.

Figure 2:
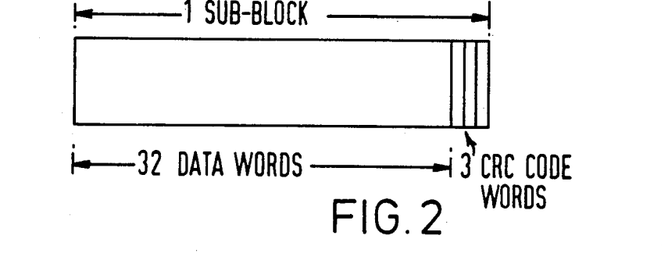
FIG. 2 indicates a sub-block.

The 16-bit shuffled words are then sub-divided into 8-bit words and formed into sub-blocks structured as indicated in FIG. 2. Each sub-block consists of thirty-two 8-bit data words, formed by the sub-division of the 16-bit digital sample signals and redundant words, and three associated 8-bit cyclic redundancy check (CRC) code words. The CRC code is used for the basic error detection after reproduction.

Figure 3:
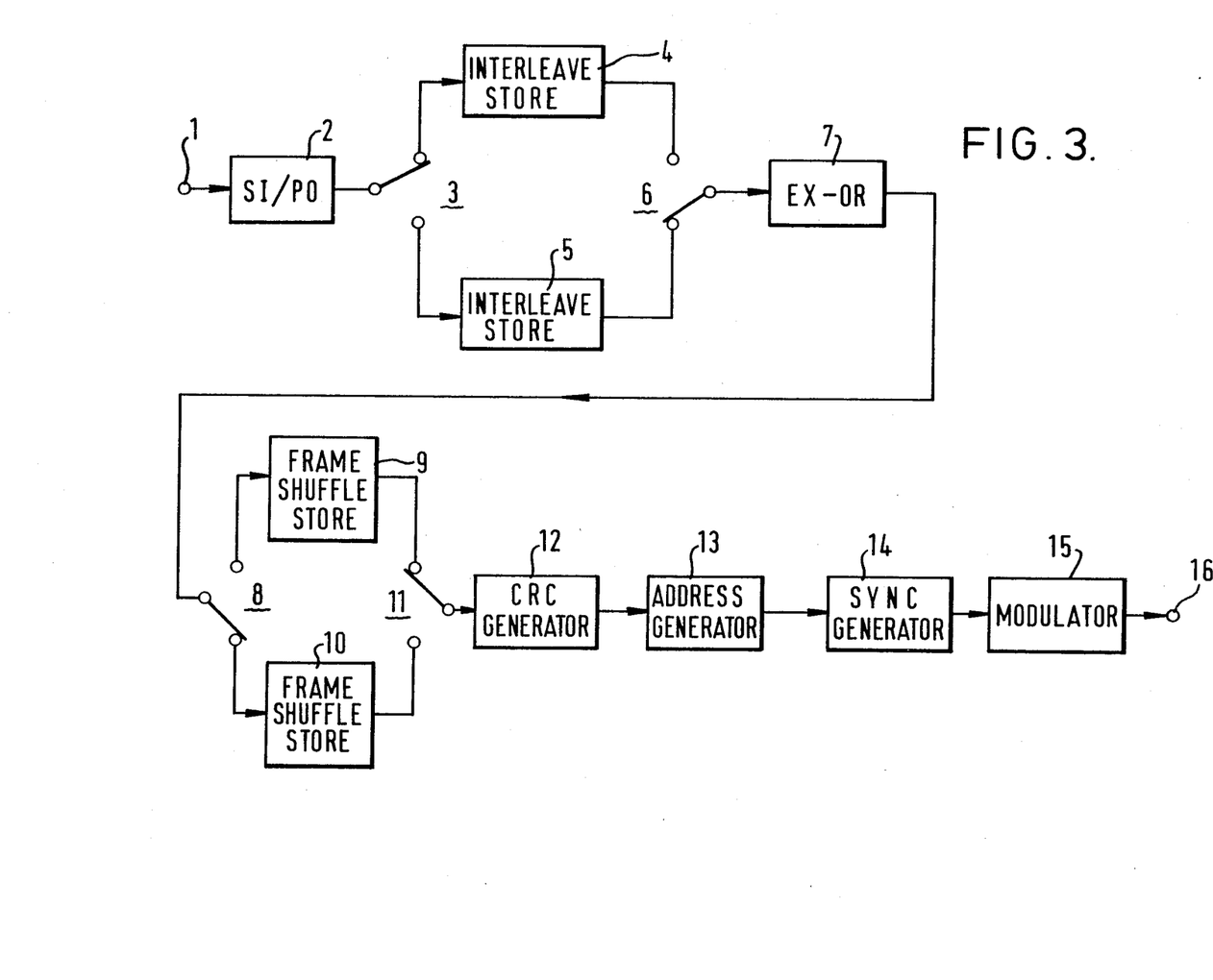
FIG. 3 is a schematic block diagram of a recording processor.

The above operations are carried out sequentially in a recording processor which will now be briefly described with reference to FIG. 3. The recording processor receives data in a serialized format, and additionally the data will generally be multiplexed as it will relate to more than one channel, for example the two channels of a stereophonic signal. In fact, in the recording processor shown in FIG. 3 it is assumed that the data relates to four multiplexed channels.

The serialized multiplexed data is supplied by way of an input 1 to a series in/parallel out device 2 which supplies its parallel output consisting of the 16-bit digital sample signals selectively by way of a switch 3 first and second interleave stores 4 and 5. The interleave stores 4 and 5 not only interleave the 16-bit digital sample signals so as to ensure that data samples from any given audio channel are separated in the correction units by a word distance of four, but also format the data into the correction units. This interleaving operation can assist concealment if the error correction to be described below fails, since adjacent samples on either side of a sample in error can be used for linear interpolation of the error sample by averaging. Thus if three adjacent samples in the correction unit come through the error correcting operation and are still in error, then because of the interleaved format used, each word would be separated by a distance of four on de-interleaving. This would mean that interpolation as outlined above could be achieved. However, if there were no such interleaving, then the three error samples would still be grouped together and any attempt at interpolation would of course be incorrect.

The outputs of the interleave stores 4 and 5 are selectively supplied by way of a switch 6 to an exclusive-OR generator 7. The switches 3 and 6 are controlled so that one interleave store 4 or 5 is being written into while the other is being read from.

The exclusive-OR generator 7 derives from the six data words $M_1$ to $M_6$ of each correction unit, the six redundant words $R_1$ to $R_6$ as outlined above and all the words of the correction unit are then selectively written by way of a switch 8 into one or other of first and second frame shuffle stores 9 and 10. The shuffle stores 9 and 10 are referred to as frame shuffle stores because it is convenient where the recording and reproducing device to be used is actually or in the form of a video tape recorder, that each of the shuffle stores 9 and 10 should store an amount of data corresponding to one television frame, even although in the present case the data is in fact audio data. More generally, it is desirable that the shuffle stores 9 and 10 should be large, so as to permit shuffling over a large span of data. The correction units are selectively written into the frame shuffle stores 9 and 10 under control of the switch 9 and read therefrom under control of a switch 11. One frame shuffle store 9 or 10 is written into while the other is being read from. The shuffling is performed under control of an algorithm which effects the shuffling of the data words in a predetermined manner such that the necessary de-shuffling can be achieved after reproduction. The frame shuffle stores 9 and 10 also arrange the data words into 8-bit format and into the above-mentioned sub-block format with gaps for the addition of the CRC code, and additionally for the inclusion of synchronization and address words.

The formatted data is supplied by way of the switch 11 to a CRC generator 12 which is basically a pseudo-random polynomial generator which derives the three-word CRC code for insertion into the appropriate gaps. The sub-blocks then pass to an address generator 13 and a sync signal generator 14 which derive and insert the required address and synchronization signals.

Finally, the formatted data sequence is supplied to a modulator 15 which modulates the data, for example using the scrambled NRZ modulation technique, to put it into form suitable for recording on a recording device such as a video tape recorder. The output of the modulator 15 is supplied by way of an output 16 to the recording device (not shown) and where the recording device is a multi-channel device, such as a four-channel recorder, then output stores (not shown) corresponding in number to the number of channels may be interposed between the output 16 and the recording device.

After reproduction, when the 8-bit words have been reassembled into the original sub-blocks, a 3-word CRC code is generated for each sub-block and compared with the reproduced 3-word CRC code. If there is any lack of agreement between the two CRC codes then all the words in the sub-block are flagged as being in error. Error flagging is done by adding an error flag formed by a ninth bit to each 8-bit word and denoting whether or not the word is in error by the state of the error flag. Thus, "1" may indicate an error and "0" may indicate no error.

Figure 4:
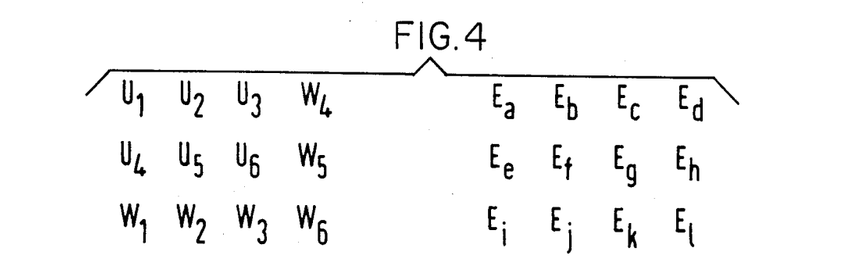
FIG. 4 indicates the words forming a reconstructed correction unit and the corresponding error flags.

The 12-word correction units are then reconstructed. FIG. 4 indicates a reconstructed correction unit in which the block on the left comprises $U_1$ to $U_6$ representing the reproduced 16-bit words respectively corresponding to the digital sample signals $M_1$ to $M_6$, and $W_1$ to $W_6$ represent the reproduced 16-bit words corresponding respectively to the redundant words $R_1$ to $R_6$. Additionally, as indicated in the block on the right of FIG. 4, each word in the correction unit now has an error flag as represented by $E_a$ to $E_l$.

Figure 5:
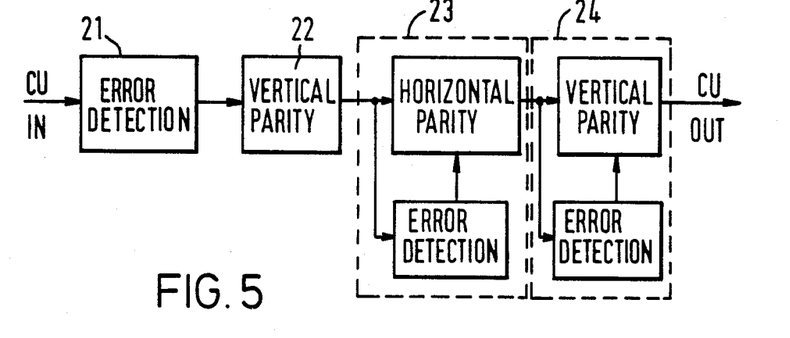
FIG. 5 is a schematic block diagram of an error detection and correction system.
Figure 6:
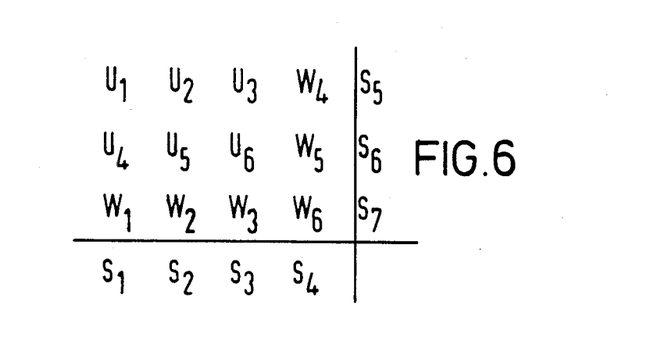
FIG. 6 indicates the generation of syndromes from the reconstructed correction unit.

The reconstructed correction units (CU) are then supplied to the input of error detecting and correcting apparatus which is schematically shown in FIG. 5. The first stage 21 shown is that of error detection. Although individual words within a correction unit have already been checked using the CRC code, this error detection state 21 attempts to modify the error flags within certain restrictions. Syndrome words $S_1$ to $S_7$ are generated as indicated in FIG. 6, the individual syndrome words $S_1$ to $S_7$ being derived by exclusive-OR operations as follows:

$$S_1 = U_1 \oplus U_4 \oplus W_1$$

$$S_2 = U_2 \oplus U_5 \oplus W_2$$

$$S_3 = U_3 \oplus U_6 \oplus W_3$$

$$S_4 = W_4 \oplus W_5 \oplus W_6$$

$$S_5 = U_1 \oplus U_2 \oplus U_3 \oplus W_4$$

$$S_6 = U_4 \oplus U_5 \oplus U_6 \oplus W_5$$

$$S_7 = W_1 \oplus W_2 \oplus W_3 \oplus W_6$$

Horizontal and vertical syndrome words are then compared. Consider, for example, the situation where the word $U_1$ is flagged as being in error, but both the syndrome words $S_1$ and $S_5$ are zero. In this situation it is assumed that this is a wrongly flagged error, and the error flag is reset to "0". Similarly, if the word $U_1$ is not flagged as being in error, but both of the syndrome words $S_1$ and $S_5$ are non-zero, then it is assumed that there is an undetected error, and the word $U_1$ has its error flag set to "1". It should be emphasised that a decision to set or reset an error flag is made only if both of the relevant syndrome words agree. What this means in effect is that thirty-two bits are used to check each digital sample signal.

The next stage 22 shown is that of vertical parity correction. Vertical parity correction is implemented by examining each column of the correction unit to see if there is a single error flag. If only a single error flag is present, then the associated word flagged in error is corrected by an exclusive-OR operation using the relevant column syndrome word, and then the error flag is reset to "0". If the initial check shows that more than one word in any column is flagged as being in error, then the vertical parity correction cannot operate, and the correction unit merely passes to the next stage 23 in the system.

The next (dotted line) stage 23 shown is that of horizontal parity correction. Horizontal parity correction is implemented by examining each row of the correction unit to see if there is only a single error flag. If this check shows that only a single word is in error, then the word in error is corrected by an exclusive-OR operation with the relevant row syndrome, and the error flag is then reset to "0". If more than one word in any row is flagged in error, then the horizontal parity check cannot operate.

At the horizontal parity correction state 23 further error detection is implemented to investigate the possibility of undetected errors. This is achieved by examining the horizontal syndromes. In particular, if any row has no error flags but the relevant syndrome word is non-zero, then each of the words in that row is flagged as being in error.

The final (dotted line) stage 24 shown is that of further vertical parity correction. Vertical parity correction is implemented by again examining each column of the correction unit to see if there is only a single error flag. If this check shows that only a single word is in error, then the word in error is corrected by an exclusive-OR operation with the relevant column syndrome, and the error flag is then reset to "0". If more than one word in any column is flagged in error, then the vertical parity check still cannot operate.

At the vertical parity correction stage 24 further error detection is implemented to investigate the possibility of undetected errors. This is achieved by examining the vertical syndromes. In particular, if any column has no error flags but the relevant syndrome word is non-zero, then each of the words in that column is flagged as being in error.

From this final stage 24 the correction unit with all the above mentioned corrections having been carried out is passed to an output for further processing. This further processing can comprise concealment of the remaining errors, for example, by interpolation taking an average value of the digital sample signals on each side of a digital sample signal in error and replacing the error word with concealment word so derived, or, in cases where there is a sequence of error words, effecting some sort of fading, for example linear fading from the last digital sample signal not in error.

The digital sample signals are then digital-to-analog converted to derive a replica of the original analog audio signal and this analog signal may then be supplied to one or more loudspeakers.

Figure 7:
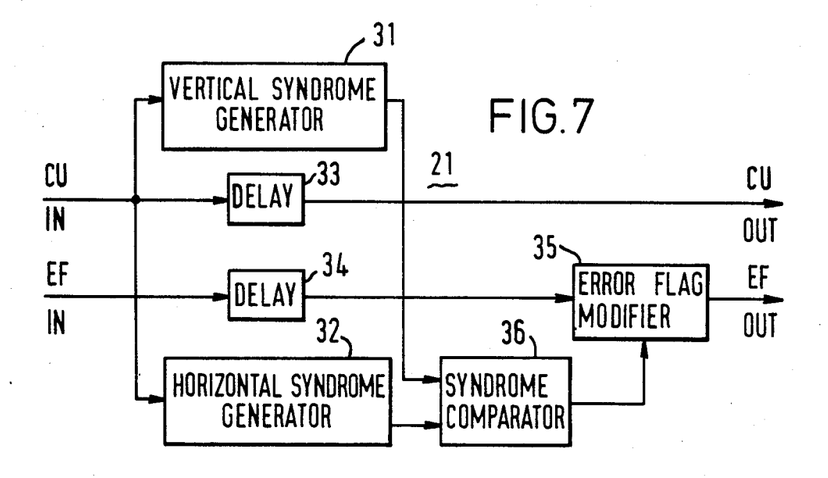
FIGS. 7 to 10 are block diagrams respectively showing parts of the system of FIG. 5 in more detail.

The error detection state 21 of FIG. 5 will now be described in more detail with reference to FIG. 7. This comprises a vertical syndrome generator 31, a horizontal syndrome generator 32 and a delay circuit 33, to each of which each incoming correction unit, in the form of the twelve words of the correction unit in series, is supplied. The incoming error flags (EF) are supplied to a delay circuit 34, the output of which is supplied to an error flag modifier 35. The output of the syndrome generators 31 and 32 are supplied to a syndrome comparator 36, the output of which controls the error flag modifier 35. The delay circuit 33 has a delay period corresponding to twelve words and the delay circuit 34 has a delay period corresponding to eleven words. The output correction unit is derived from the delay circuit 33 and the output error flags are derived from the error flag modifier 35. It will be noted that the correction unit itself passes unchanged through this error detection block, and is merely delayed so as to remain in synchronism with its error flags.

The operation of the error detection block is as follows. The syndrome generators 31 and 32 derive the syndrome words $S_1$ to $S_7$ as set out above from each incoming correction unit and supply the syndrome words $S_1$ to $S_7$ to the syndrome comparator 36 which, in dependence on the comparison, may modify the relevant error flag. Taking the same example as given above, if the word $U_1$ is flagged as being in error, but both the syndrome words $S_1$ and $S_5$ are zero, it is assumed that this is a wrongly flagged error and the error flag modifier 35 is controlled to reset the error flag to "0". Likewise, if the word $U_1$ is not flagged as being in error, but both of the syndrome words $S_1$ and $S_5$ are non-zero, then it is assumed that there is an undetected error, and the error flag modifier 35 sets the error flag to "1".

Figure 8:
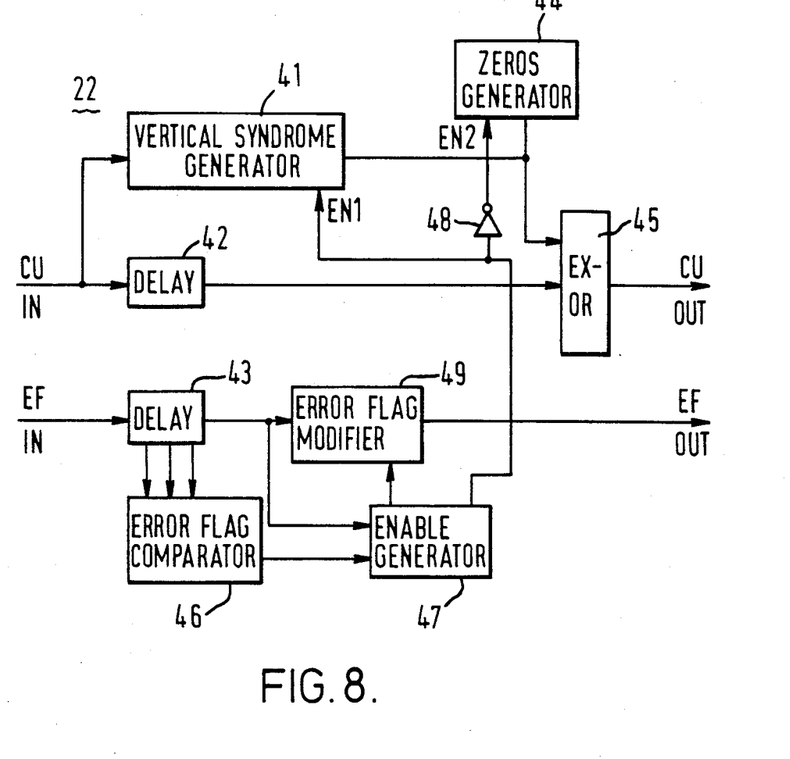

The vertical parity correction stage 22 of FIG. 5 will now be described in more detail with reference to FIG. 8. This comprises a vertical syndrome generator 41 and a delay circuit 42, to each of which each incoming correction unit is supplied. The incoming error flags are supplied to a delay circuit 43. This stage 22 also includes a zeros generator 44 which generates 16-bit words consisting of all "0", the outputs of the vertical syndrome generator 41 and the zeros generator 44 being supplied in common to one input of a 16-bit exclusive-OR cirucit 45. To the other input of the exclusive-OR circuit 45 is supplied the output of the delay circuit 42, and the output correction unit is derived from the output of the exclusive-OR circuit 45. Both of the delay circuits 42 and 43 have a delay period of three words.

Three outputs are derived from the delay circuit 43 to enable the error flags of all three words in a column of the correction unit to be examined in an error flag comparator 46, the output of which controls an enable signal generator 47. The enable signal generator 47 also receives an input from the delay circuit 43 to synchronize the enable signal produced by the enable signal generator 47 with the error flags. The enable signal generator 47 also receives an input from the delay circuit 43 to synchronise the enable signal produced by the enable signal generator 47 with the error flags. The enable signal produced by the enable signal generator 47 is a rectangular wave signal which is supplied directly to the vertical syndrome generator 41 as an enable signal EN1 and is supplied by way of an inverter 48 as an enable signal EN2 to the zeros generator 44. Thus the enable signals EN1 and EN2 are inverted relative to one another so that at any given moment one only of the vertical syndrome generator 41 and the zeros generator 44 are enabled to supply an output signal to the exclusive-OR circuit 45. The enable signal generator 47 also supplies an output signal to an error flag modifier 49 which is connected to the output of the delay circuit 43 and from which the output error flags are derived.

The operation of this vertical parity correction stage 22 is as follows. Basically, each 16-bit word in each correction unit has another 16-bit word combined with it in an exclusive-OR operation, and this stage 22 operates to determine whether this other word should be the relevant column syndrome word generated by the vertical syndrome generator 41 or an all "0" word generated by the zeros generator 44. In the latter case, the exclusive-OR operation will of course have no effect on the incoming word. The decision is made by the error flag comparator 46 which examines the error flags corresponding to each column of the correction unit to see if there is a single error flag. If there is only a single error flag, then the enable signal generator 47 is controlled such that the enable signal EN1 supplied to the vertical syndrome generator 41 enables the supply of the relevant column syndrome word to the exclusive-OR circuit 45 in synchronism with the word in that column which is flagged in error. At this time, the enable signal EN2 disables the output of the zeros generator 44. Additionally, the enable signal generator 47 supplies a signal to the error flag modifier 49 so that the relevant error flag is reset to zero.

On the other hand, if the error flag comparator 46 determines that in any column of the correction unit there are either no error flags or more than one error flag, then the enable signal generator 47 is controlled such that the enable signal EN1 disables the output of the vertical syndrome generator 41 and the enable signal EN2 enables the output of the zeros generator 44. In other words, in this case, no vertical parity correction takes place and the correction unit and the error flags pass unchanged to the next stage 23 in the system.

Figure 9:
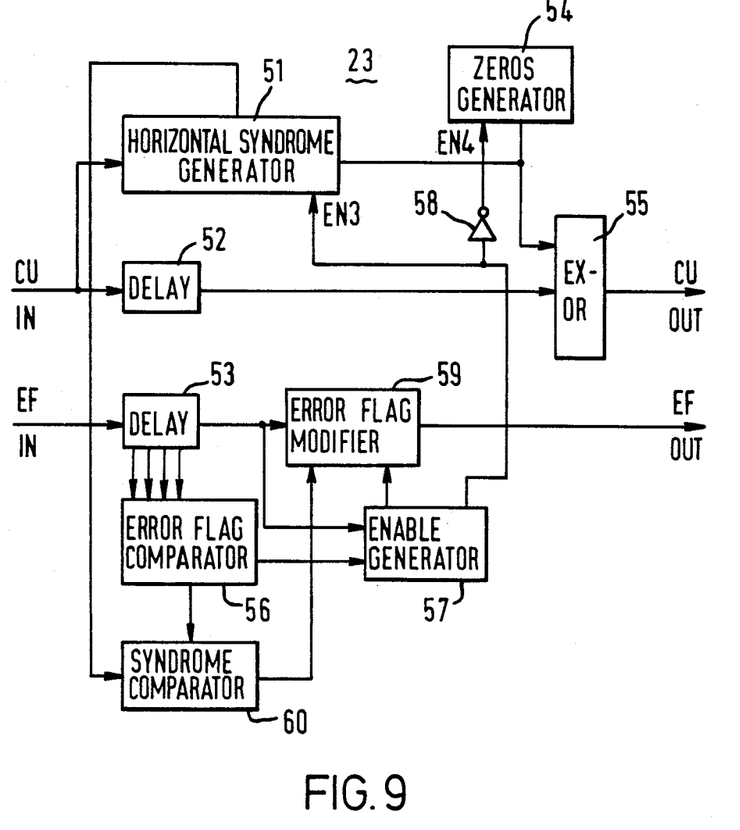

The horizontal parity correction and detection stage 23 of FIG. 5 will now be described in more detail with reference to FIG. 9. This comprises a horizontal syndrome generator 51 and a delay circuit 52, to each of which each incoming correction unit is supplied. The incoming error flags are supplied to a delay circuit 53. This stage 23 also includes a zeros generator 54 which generates 16-bit words consisting of all "0", the outputs of the horizontal syndrome generator 51 and the zeros generator 54 being supplied in common to one input of a 16-bit exclusive-OR circuit 55. To the other input of the exclusive-OR circuit 55 is supplied the output of the delay circuit 52, and the output correction unit is derived from the outut of the exclusive-OR circuit 55. Both of the delay circuits 52 and 53 have a delay period of four words.

Four outputs are derived from the delay circuit 53 to enable the error flags of all four words in a row of the correction unit to be examined in an error flag comparator 56, the output of which controls an enable signal generator 57. The enable signal generator 57 also receives an input from the delay circuit 53 to synchronize the enable signal produced by the enable signal generator 57 with the error flags. The enable signal produced by the enable signal generator 57 is a rectangular wave signal which is supplied directly to the horizontal syndrome generator 51 as an enable signal EN3, and is supplied by way of an inverter 58 as an enable signal EN4 to the zeros generator 54. Thus at any given moment one only of the horizontal syndrome generator 51 and the zeros generator 54 are enabled to supply an output signal to the exclusive-OR circuit 55. The enable signal generator 57 also supplies an output signal to an error flag modifier 59 which is connected to the output of the delay circuit 53 and from which the output error flags are derived.

The operation of the horizontal parity correction and detection stage 23 is as follows. Again, each 16-bit word in each correction unit has another 16-bit word combined with it in an exclusive-OR operation, and this stage 23 operates to determine whether this other word should be the relevant row syndrome word generated by the horizontal syndrome generator 51 or an all "0" word generated by the zeros generator 54. In the latter case, the exclusive-OR operation will have no effect on the incoming word. A decision is made by the error flag comparator 56 which examines the error flags corresponding to each row of the correction unit to see if there is a single error flag. If there is only a single error flag, then the enable signal generator is controlled such that the enable signal EN3 is supplied to the horizonatal syndrome generator 51 enables the supply of the relevant row syndrome word to the exclusive-OR circuit 55 in synchronism with the word in that row which is flagged in error. At this time, the enable signal EN4 disables the output of the zeros generator 54. Additionally, the enable signal generator 57 supplies a signal to the error flag modifier 59 so that the relevant error flag is reset to zero.

On the other hand, if the error flag comparator 56 determines that in any row of the correction unit there are either no error flags or more than one error flag, then the enable signal generator 57 is controlled such that the enable signal EN3 disables the output of the horizontal syndrome generator 51 and the enable signal EN4 enables the output of the zeros generator 54. In other words, in this case, no horizontal parity correction takes place.

Additionally, in this stage 23 the possibility of undetected errors is investigated. For this purpose the horizontal syndromes are supplied from the horizontal syndrome generator 51 to a syndrome comparator 60 which also receives an input from the error flag comparator 56 and supplies an output to the error flag modifier 59. The operation of this part of this stage 23 is such that if any row of the correction unit has no error flags, but the row syndrome word is non-zero, then each of the words in that row is flagged as being in error.

The vertical parity correction and detection stage 24 of FIG. 5 will now be described in more detail with reference to FIG. 10. This comprises a vertical syndrome generator 61 and a delay circuit 62, to each of which each incoming correction unit is supplied. The incoming error flags are supplied to a delay circuit 63. This stage 24 also includes a zeros generator 64 which generates 16-bit words consisting of all "0", the outputs of the vertical syndrome generator 61 and the zeros generator 64 being supplied in common to one input of a 16-bit exclusive-OR circuit 65. To the other input of the exclusive-OR circuit 65 is supplied the output of the delay circuit 62, and the output correction unit is derived from the output of the exclusive-OR circuit 65. Both of the delay circuits 62 and 63 have a delay period of three words.

Three outputs are derived from the delay circuit 63 to enable the error flags of all three words in a column of the correction unit to be examined in an error flag comparator 66, the output of which controls an enable signal generator 67. The enable signal generator 67 also receives an input from the delay circuit 63 to synchronise the enable signal produced by the enable signal generator 67 with the error flags. The enable signal produced by the enable signal generator 67 is a rectangular wave signal which is supplied directly to the vertical syndrome generator 61 as an enable signal EN5 and is supplied by way of an inverter 68 as an enable signal EN6 to the zeros generator 64. Thus at any given moment one only of the vertical syndrome generator 61 and the zeros generator 64 are enabled to supply an output signal to the exclusive-OR circuit 65. The enable signal generator 67 also supplies an output signal to an error flag modifier 69 which is connected to the output of the delay circuit 63 and from which the output error flags are derived.

The operation of the vertical parity correction and detection stage 24 is as follows. Again, each 16-bit word in each correction unit has another 16-bit word combined with it in an exclusive-OR operation, and the block operates to determine whether this other word should be the relevant column syndrome word generated by the vertical syndrome generator 61 or an all "0" word generated by the zeros generator 64. In the latter case, the exclusive-OR operation will have no effect on the incoming word. The decision is made by the error flag comparator 66 which examines the error flags corresponding to each row of the correction unit to see if there is a single error flag. If there is only a single error flag, then the enable signal generator 67 is controlled such that the enable signal EN5 supplied to the vertical syndrome generator 61 enables the supply of the relevant column syndrome word to the exclusive-OR circuit 65 in synchronism with the word in that column which is flagged in error. At this time, the enable signal EN6 disables the output of the zeros generator 64. Additionally, the enable signal generator 67 supplies a signal to the error flag modifier 69 so that the relevant error flag is reset to zero.

On the other hand, if the error flag comparator 66 determines that in any column of the correction unit there are either no error flags or more than one error flag, then the enable signal generator 67 is controlled such that the enable signal EN5 disables the output of the vertical syndrome generator 61 and the enable signal EN6 enables the output of the zeros generator 64. In other words, in this case, no vertical parity correction takes place.

Additionally, in this stage 24 the possibility of undetected errors is again investigated. For this purpose the vertical syndromes are supplied from the vertical syndrome generator 61 to a syndrome comparator 70 which also receives an input from the error flag comparator 66 and supplies an output to the error flag modifier 69. The operation of this part of the block is such that if any column of the correction unit has no error flags, but the column syndrome word is non-zero, then each of the words in that row is flagged as being in error.

Figure 10:
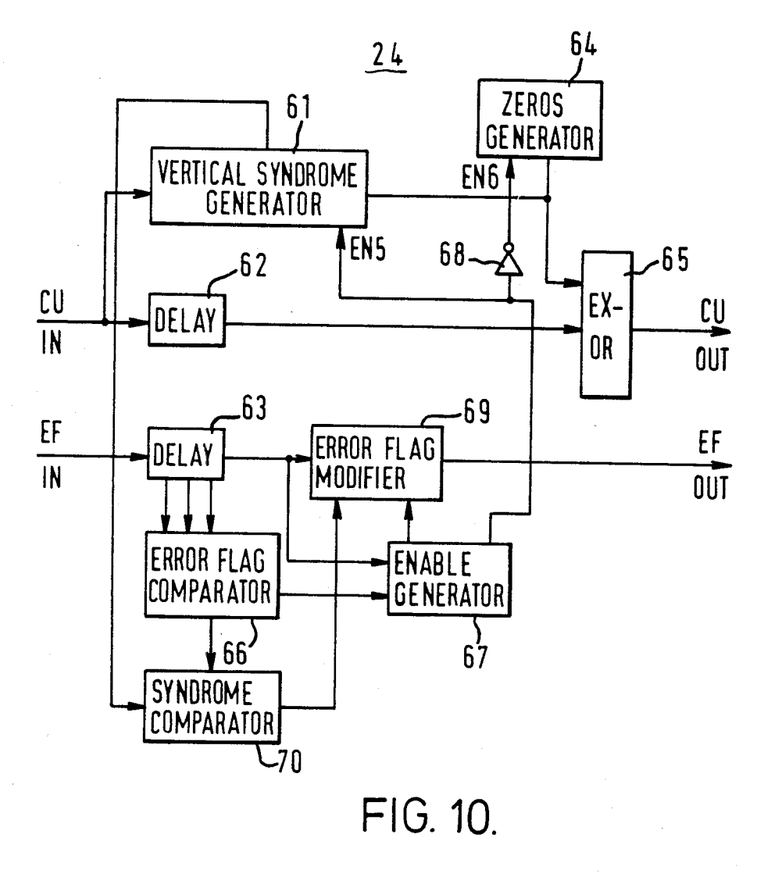

As previously indicated, from this stage 24 of FIG. 10 the correction unit with all the described corrections having been made is passed to an output for further processing. This further processing can include concealment of the remaining errors or some sort of fading. The digital sample signals are then digital-to-analog converted and the resulting analog audio signal may then be supplied to one or more loudspeakers for reproduction.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of detecting and correcting errors in digital audio signals, the method comprising the steps of:
    assembling digital words, each of which corresponds to a digital audio signal representing a sample of an analog audio signal, into units consisting of m rows by n columns of said data words;
    assembling with each said unit a plurality of redundant words derived by a respective exclusive-OR operation on said data words in each row and each column of said unit;
    shuffling the order of said data words and said redundant words and then assembling the shuffled words into sub-blocks, deriving from said words in each said sub-block a plurality of error detection code words and adding said code words to the respective sub-block;
    recording and reproducing each said sub-block;
    after reproduction, using said code words of each said sub-block to set the logic state of error flags that have been added to each said word in said sub-block;
    de-shuffling the order of said shuffled words and then re-forming said units and assembling with each said reproduced unit a plurality of horizontal and vertical syndromes derived by a respective exclusive-OR operation on said data words and said redundant word in each row and each column of said unit;
    comparing selected ones of said horizontal and vertical syndromes associated with said sub-block and resetting the logic state of said error flags in dependence on said comparison;
    deriving further horizontal syndromes by a respective exclusive-OR operation on said data words and said redundant word in each row of said reproduced unit and, where there is only a single word in that row flagged as being in error, correcting that error word using said further horizontal syndrome; and
    deriving further vertical syndromes by a respective exclusive-OR operation on said data words and said redundant word in each column of said reproduced unit and, where there is only a single word in that column flagged as being in error, correcting that error word using said further vertical syndrome.

2. A method according to claim 1 wherein each said data word and each said redundant word is a 16-bit word.

3. A method according to claim 2 wherein said data words and said redundant words are split into 8-bit words for assembly into said sub-blocks.

4. A method according to claim 1 wherein m is 2 and n is 3.

5. A method according to claim 1 wherein said code words are cyclic redundancy check code words.

6. A method according to claim 1 wherein, when an error word is corrected using said further horizontal syndrome, the error flag associated with said word is re-set so that the word is no longer flagged as being in error.

7. A method according to claim 1 wherein, when a word is corrected using said further vertical syndrome, the error flag associated with said word is reset so that the word is no longer flagged as being in error.

8. Apparatus for detecting and correcting errors in digital audio signals, the apparatus comprising:
    means for assembling digital data words, each of which corresponds to a digital audio signal representing a sample of an analog audio signal, into units consisting of m rows by n columns of said data words;
    means receiving said units of data words to derive a plurality of redundant words by a respective exclusive-OR operation on said data words in each row and each column of said unit and to assemble said redundant words with said unit;
    means receiving said assembled unit of data words and respective redundant words to shuffle the order of said data words and said redundant words;
    means receiving said shuffled data words and redundant words to assemble said data words and said redundant words into sub-blocks, to derive from said words in each said sub-block a plurality of error detection code words, and to add said code words to the respective sub-block;
    means to record and reproduce each said sub-block;
    means operative after reproduction for using said code words of each said sub-block to set the logic state of error flags added to each said word in that said sub-block;
    means to de-shuffle the order of said shuffled data words and redundant words;
    means receiving said de-shuffled data words and redundant words to re-form said units and to derive by a respective exclusive-OR operation on said data words and said redundant word in each row and each column of said unit a respective first horizontal and vertical syndrome and to associate said syndromes with said unit;
    means to compare selected ones of said first horizontal and vertical syndromes and to reset the logic state of said error flags in dependence on said comparison;
    means receiving said re-formed units to derive second horizontal syndromes by a respective exclusive-OR operation on said data words and said redundant word in each row of said reproduced unit and, where there is only a single word in that row flagged as being in error, to correct that error word using said second horizontal syndrome; and
    means receiving said re-formed units for deriving second vertical syndromes by a respective exclusive-OR operation on said data words and said redundant word in each column of said reproduced unit and, where there is only a single word in that column flagged as being in error, correcting that error word using said second vertical syndrome.

9. Apparatus according to claim 8 wherein each said data word and each said redundant word is a 16-bit word.

10. Apparatus according to claim 9 further comprising means to split said data words and said redundant words into 8-bit words for assembly into said sub-blocks.

11. Apparatus according to claim 8 wherein m is 2 and n is 3.

12. Apparatus according to claim 8 wherein said code words are cyclic redundancy check code words.

13. Apparatus according to claim 8 further comprising means operative when an error word is corrected using said second horizontal syndrome to re-set the error flag associated with said word so that the word is no longer flagged as being in error.

14. Apparatus according to claim 8 further comprising means operative when a word is corrected using said second vertical syndrome to re-set the error flag associated with said word so that the word is no longer flagged as being in error.

* * * * *